(12) United States Patent
Wells et al.

(10) Patent No.: US 6,534,960 B1
(45) Date of Patent: Mar. 18, 2003

(54) MULTI-CHANNEL INTERLEAVED POWER CONVERTER WITH CURRENT SHARING

(75) Inventors: James Edward Wells, Merrimack, NH (US); Norbert James Hepfinger, Merrimack, NH (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/174,100

(22) Filed: Jun. 18, 2002

(51) Int. Cl.[7] .............................. G05F 1/40; G05F 1/44; G05F 1/56
(52) U.S. Cl. ..................... 323/222; 323/284; 323/286
(58) Field of Search ................................ 323/222, 282, 323/286, 290, 284

(56) References Cited

U.S. PATENT DOCUMENTS

| 5,861,734 A | * | 1/1999 | Fasullo et al. ............... 323/222 |
| 5,870,296 A | * | 2/1999 | Schaffer ....................... 363/65 |
| 6,111,440 A | * | 8/2000 | Rajagopalan et al. ....... 327/137 |
| 6,215,290 B1 | * | 4/2001 | Yang et al. .................. 323/282 |
| 6,404,175 B1 | * | 6/2002 | Yang et al. .................. 323/282 |
| 6,433,527 B1 | * | 8/2002 | Izadinia et al. ............. 323/300 |

* cited by examiner

Primary Examiner—Bao Q. Vu
(74) Attorney, Agent, or Firm—W. Daniel Swayze, Jr.; W. James Brady; Frederick J. Telecky, Jr.

(57) ABSTRACT

A multi-channel interleaved power converter includes first and second per-channel conversion circuits, each including a pulse width modulator (PWM), a driver PWM, an output inductor carrying load current, and a current controlled current source (CCCS) coupled to sense the inductor current. The inductors of the different channels are coupled in common to an output node of the power converter. Summing circuitry is operative (i) to subtract the output current of the second channel CCCS from the output current of the first channel CCCS, (ii) to convert the difference current into an offset, and (iii) to apply the offset to a first PWM control signal to generate a second PWM control signal for the second channel. The PWM control signals cause respective currents to be established in the inductors of the different channels according to a predetermined desired current relationship, such as equality.

6 Claims, 3 Drawing Sheets

MULTI-CHANNEL INTERLEAVED POWER CONVERTER WITH CURRENT SHARING

CROSS REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

The invention is related to the field of power converters, and more particularly to multi-channel interleaved power converters.

Interleaved power converters employ two or more channels of conversion circuitry operating in a time-multiplexed or interleaved fashion. Although the control of interleaved converters is generally more complex than the control of non-interleaved converters, there are advantages that may offset the increased complexity in certain application. The advantages include, for example, reduced ripple and faster response to load transients.

One general aspect of interleaved converters is the degree of balance among the channels in sharing the load. It is generally desirable that the load be shared as equally as possible. Various techniques have been used to manage the sharing of the load among the different channels in interleaved converters. One general approach has been to sense the current in output inductors of the various channels, add these sensed values together and divide by the number of channels to obtain an average current, and then subtract the actual current in each channel from the average to obtain per-channel difference values. The difference value for each channel is then used to adjust the amount of current supplied by the channel so as to evenly distribute the current load among the channels. While this approach can be effective, the several steps involved in obtaining the per-channel difference values are arrived at in an indirect and somewhat inefficient fashion. It would be desirable to employ simpler load-sharing circuitry that provides per-channel current adjustment in a more direct manner.

BRIEF SUMMARY OF THE INVENTION

In accordance with the present invention, a multi-channel interleaved power converter is disclosed having improved load-sharing circuitry.

The disclosed interleaved converter includes first and second per-channel conversion circuits, each including a pulse width modulator (PWM), a driver coupled to the PWM, an inductor coupled to the driver, and a current controlled current source (CCCS) coupled to sense the current in the inductor. The inductors of the per-channel circuits are coupled in common to an output node of the power converter. Load current provided by the different channels flows through the respective inductors.

The converter further includes current summing circuitry operative (i) to subtract the output current of the CCCS of the second channel from the output current of the CCCS of the first channel, (ii) to convert the difference current into a corresponding offset, and (iii) to apply the offset to a first PWM control signal to generate a second PWM control signal for the second per-channel circuit. The second PWM control signal is generated such that respective currents are established in the inductors of the different channels according to a predetermined desired current relationship. Commonly, the desired relationship is one of equality, i.e., equal sharing of load current, but other desired relationships are possible. In one embodiment, the current summing circuitry comprises a capacitor that integrates the difference between the two currents of the CCCSs to adjust the level of the second PWM control signal with respect to the first PWM control signal so as to bring about the desired current relationship in the inductors of the channels.

The disclosed converter achieves good balancing of load current among the different channels while economizing on circuit area and complexity, making it attractive from the perspectives of robustness and cost.

Other aspects, features, and advantages of the present invention will be apparent from the detailed description that follows.

BRIEF DESCRIPTION OF THE SEVERAL VIEWS OF THE DRAWING

The invention will be more fully understood by reference to the following Detailed Description of the Invention in conjunction with the Drawing, of which.

DETAILED DESCRIPTION OF THE INVENTION

Figure 1:
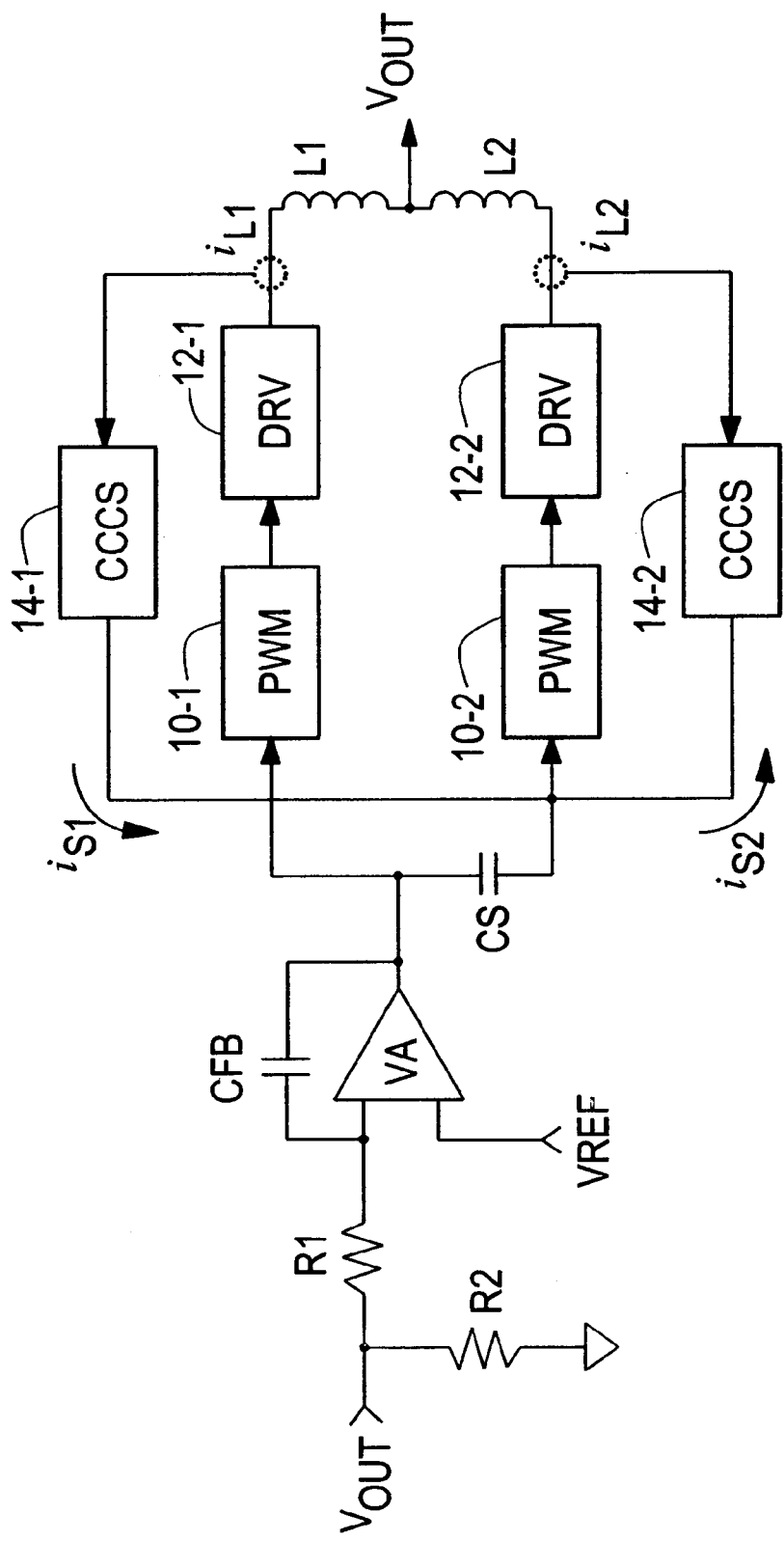
FIG. 1 is a general block diagram of an interleaved power converter according to the present invention.
Figure 2:
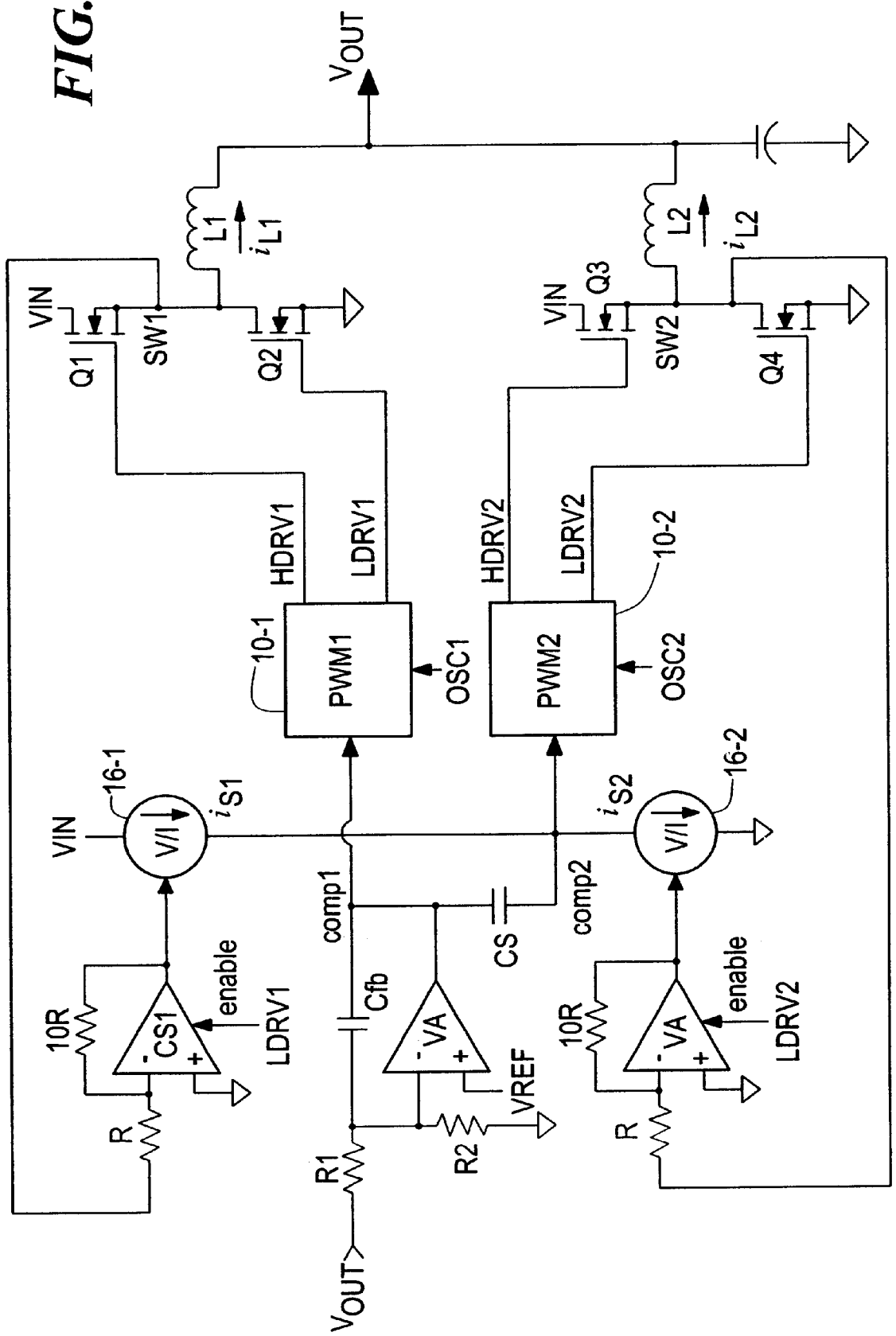
FIG. 2 is a schematic diagram of an implementation of the power converter of FIG. 1.

FIG. 1 shows an interleaved converter having a pair of pulse width modulator (PWM) circuits 10-1 and 10-2, a pair of driver (DRV) circuits 12-1 and 12-2, and output inductors L1 and L2. As is known in the art, the PWM circuits 10-1 and 10-2 are driven at the same frequency but with a phase shift depending on the number of channels. For a two channel converter such as shown in FIG. 2, the PWM circuits 10-1 and 10-2 are preferably operated 180° out of phase.

The converter includes two feedback loops. An outer voltage loop includes an integrating amplifier comprising a voltage amplifier VA, resistors R1 and R2, and a capacitor CFB. The voltage amplifier VA receives a reference voltage VREF corresponding to the desired output voltage of the converter. An inner current loop includes a pair of current-controlled current sources (CCCS) 14-1 and 14-2 and a current-sharing capacitor CS, which are also collectively referred to as "current sharing circuitry". CCCS 14-1 senses the current $i_{L1}$ in the inductor L1 and generates an output "share" current $i_{S1}$, and CCCS 14-2 senses the current $i_{L2}$ in the inductor L2 and generates an output share current $i_{S2}$. The outputs of CCCS 14-1 and 14-2 are connected to one node of the capacitor CS and to the input of the PWM 10-2.

The outer voltage loop controls the output voltage $V_{OUT}$ by controlling the duty cycles of the PWM circuits 10-1 and 10-2, as is known in the art. When $V_{OUT}$ is above the desired level, the voltages of the control signals for the PWM circuits 10-1 and 10-2 are reduced, reducing the duty cycles of the pulse width modulated signals supplied to the DRV circuits 12-1 and 12-2 and of the drive supplied to the load through the inductors L1 and L2, resulting in a reduction in the output voltage $V_{OUT}$. The opposite occurs when $V_{OUT}$ is below the desired level.

The current sharing circuitry operates to balance the currents $i_{L1}$ and $i_{L2}$ in the inductors L1 and L2. The sensed inductor currents $i_{L1}$ and $i_{L2}$ cause proportional share currents $i_{S1}$ and $i_{S2}$, which are subtracted at the lower node of the share capacitor CS. When the currents $i_{L1}$ and $i_{L2}$ in each channel are equal, then the average current in the capacitor CS is zero and its voltage $V_{CS}$ is stable. In this case, the respective duty cycles of the PWM circuits 10-1 and 10-2 are also stable, although they may be different. When the currents $i_{L1}$ and $i_{L2}$ in each channel are different, then the average current in the capacitor CS is either positive or negative, causing its voltage $V_{CS}$ to change accordingly. This causes a corresponding change in the duty cycle of PWM circuit 10-2 with respect to that of PWM circuit 10-1 that tends to correct for the imbalance in the inductor currents $i_{L1}$ and $i_{L2}$.

It will be appreciated that the outer voltage loop simultaneously adjusts the duty cycles of both PWM circuits 10-1 and 10-2 to maintain voltage regulation. This is achieved by controlling the input to the PWM 10-1 of channel 1, which also serves as a component of the input to the PWM 10-2 of channel 2 by virtue of the coupling through the sharing capacitor CS. For load sharing, the control signal into PWM 10-2 is adjusted relative to that of PWM 10-1 to make the current $i_{L2}$ equal to the current $i_{L1}$.

FIG. 2 shows an implementation in which each of the DRV circuits 12-1 and 12-2 of FIG. 1 is realized by corresponding pairs of transistors (Q1, Q2) and (Q3, Q4), and the CCCSs 14-1 and 14-2 of FIG. 1 are realized by corresponding sets of circuitry including current sense amplifiers CS1 and CS2, resistors R and 10R, and current sources 16-1 and 16-2. Each amplifier CS1 and CS2 is enabled by a corresponding drive control signal LDRV1 and LDRV2, and the PWM circuits 10-1 and 10-2 are clocked by corresponding oscillator signals osc1 and osc2.

In the circuit of FIG. 2, the current in each inductor L1 or L2 is sensed as a voltage appearing across Q2 or Q4 during the assertion of LDRV1 or LDRV2. This voltage arises from the "on" resistance of the device Q2 or Q4, the respective "on" resistances preferably being closely matched. Because they perform this function of converting inductor current into a corresponding voltage, the transistors Q2 and Q4 actually form part of the respective CCCSs as well as part of the respective drivers.

Figure 3:
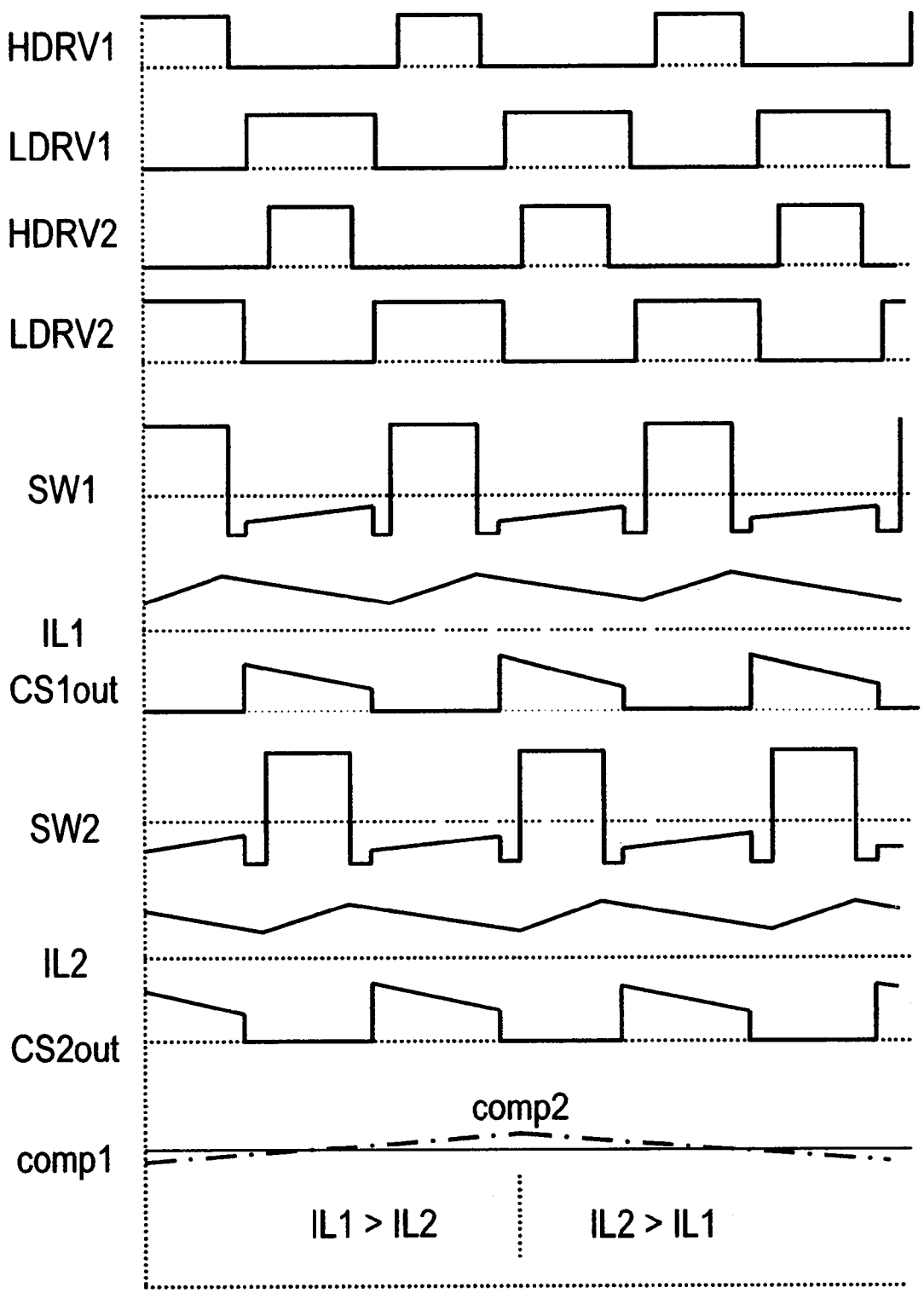
FIG. 3 is a diagram depicting several signal waveforms during operation of the circuit of FIG. 2.

FIG. 3 illustrates the operation of the circuit of FIG. 2. The voltage signals SW1 and SW2 from the driver circuits have non-overlapping positive voltage pulses during the periods corresponding to the assertion of HDRV1 and HDRV2 respectively. Also, small voltage ramps appear on SW1 and SW2 during the periods corresponding to the assertion of LDRV1 and LDRV2, which are the current sensing periods. Each inductor current $i_{L1}$ and $i_{L2}$ generally rises during the positive pulse of the corresponding signal SW1 or SW2 and falls during the remainder of the cycle. The voltage output of each amplifier CS1 and CS2 (labeled CS1out and CS2out respectively in FIG. 3) is proportional to the negative of the corresponding voltage signal SW1 or SW2 during the assertion of the corresponding LDRV signal (LDRV1 or LDRV2). In the situation illustrated in FIG. 3, the PWM 1 control signal comp1 remains stable, while the PWM 2 control signal comp2 exhibits a slight rise and fall due to the combined action of the current sources 16-1 and 16-2. FIG. 3 shows the rise and fall of the signal comp2 in a compressed fashion; in practice, even these slight changes occur only over many cycles rather than in two cycles. The output voltage loop actually responds faster than the inner current loop, thus ensuring stable operation.

It will be appreciated that a current sharing technique like that described herein may be utilized in interleaved converters having more than two channels. For example, it may be convenient to replicate the CCCSs 14 and current sharing capacitor CS for additional channels. Alternatively, a hybrid circuit may be employed that calculates an average and difference values for one set of channels, and uses the disclosed current sharing technique for another set of channels. Also, it will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A multi-channel interleaved power converter, comprising:

first and second per-channel circuits, each including (1) a pulse width modulator (PWM), (2) a driver coupled to the PWM, (3) an inductor coupled to the driver, and (4) a current controlled current source (CCCS) having an input coupled to sense the current in the inductor, the respective inductors of the per-channel circuits being coupled in common to an output node of the power converter; and current summing circuitry operative (i) to subtract the output current of the CCCS of the second per-channel circuit from the output current of the CCCS of the first per-channel circuit, (ii) to convert the difference current into a corresponding offset, and (iii) to apply the offset to a first PWM control signal to generate a second PWM control signal for the second per-channel circuit, the second PWM control signal of the second channel being generated such that respective currents are established in the inductors of the per-channel circuits according to a predetermined desired current relationship.

2. A power converter according to claim 1, wherein for each per-channel circuit: (1) the driver comprises a first switching transistor between a supply node and the inductor, the first switching transistor having an ON time and an OFF time determined by the PWM circuit, and (2) the CCCS comprises a second switching transistor between the inductor and a ground node, the second switching transistor being operative to be ON when the first switching transistor is OFF, the second switching transistors of the per-channel circuits having respective ON resistances according to a predetermined resistance relationship, and (3) the CCCS detects the current in the inductor as a voltage across the second switching transistor during its ON time.

3. A power converter according to claim 2, wherein the CCCS of each per-channel circuit includes an amplifier and a voltage-to-current converter, the amplifier being enabled only during the ON time of the second switching transistor.

4. A power, converter according to claim 1, wherein the current summing circuitry includes a capacitor, one terminal of the capacitor being coupled to the first PWM control signal and the other terminal being coupled to the respective outputs of both the CCCS of the first per-channel circuit and the CCCS of the second per-channel circuit.

5. A power converter according to claim 1, further comprising voltage control circuitry operative to generate the first PWM control signal based on the difference between the output voltage of the power converter and a predetermined desired output voltage of the power converter.

6. A power converter according to claim 5, wherein the voltage control circuitry comprises an integrating differential amplifier having an output representing the integrated difference between the actual output voltage of the power converter and the desired output voltage of the power converter.

\* \* \* \* \*